(12) United States Patent
Spencer et al.

(10) Patent No.: US 7,963,563 B2
(45) Date of Patent: Jun. 21, 2011

(54) UNIQUE LABEL FOR INDENTIFICATION OR SECURITY SYSTEM

(75) Inventors: Nicholas Spencer, Zollikon (CH); Peter Uggowitzer, Ottenbach (CH); Paul Smith, Zurich (CH); Kirill Feldman, Zurich (CH)

(73) Assignee: Eidgenossische Technische Hochschule Zurich, Zurich (CH)

( * ) Notice: Subject to any disclaimer, the term of this patent is extended or adjusted under 35 U.S.C. 154(b) by 0 days.

(21) Appl. No.: 11/993,987

(22) PCT Filed: Jun. 29, 2006

(86) PCT No.: PCT/US2006/025476
§ 371 (c)(1),
(2), (4) Date: Dec. 27, 2007

(87) PCT Pub. No.: WO2007/002873
PCT Pub. Date: Jan. 4, 2007

(65) Prior Publication Data
US 2008/0197620 A1 Aug. 21, 2008

Related U.S. Application Data

(60) Provisional application No. 60/694,931, filed on Jun. 29, 2005.

(51) Int. Cl.
*B42D 15/00* (2006.01)
*B42D 15/10* (2006.01)
(52) U.S. Cl. .............. 283/72; 283/90; 283/91; 283/904
(58) Field of Classification Search .................. 40/360, 40/616, 625, 626, 629, 630; 156/75; 235/380, 235/490, 493; 252/299.01; 257/E21.002; 264/509, 540; 283/75, 82, 90, 91, 94, 107, 283/904, 72; 340/572.6; 349/194; 356/71; 427/409, 411; 428/156, 174, 480, 481, 482, 428/483, 537, 543, 915, 916; 436/518, 524, 527, 531, 532, 546, 547, 800, 805, 808; *B29C 49/04, 49/24, 51/00, 51/16; B32B 27/36, 38/04; B41M 03/14; B42D 15/00, 15/10; C08J 05/18; C21D 01/26, 09/62; D21H 19/00, 19/12; G01N 21/64, 33/536, 33/542, 33/58*
See application file for complete search history.

(56) References Cited

U.S. PATENT DOCUMENTS
4,557,963 A * 12/1985 Caines .......................... 283/107
(Continued)

FOREIGN PATENT DOCUMENTS
EP 1 491 350 12/2004
(Continued)

OTHER PUBLICATIONS

*Database* WPI Week 199724, Acc. No. 1997-261639, XP002421308.
(Continued)

*Primary Examiner* — Dana Ross
*Assistant Examiner* — Justin V Lewis
(74) *Attorney, Agent, or Firm* — Pabst Patent Group LLP

(57) ABSTRACT

Unique labels for security or identification purposes, methods of making the labels and uses for the labels are described herein. The label is formed from one or more crystalline materials, optionally in combination with a non-crystalline material, or from a combination of polymers, and has a unique, detectable pattern. In one embodiment, the label is formed from a crystalline material, preferably a metallic material, which naturally contains a unique grain structure, with unique reflective properties. In a preferred embodiment, the label is formed of a metallic material that has been recrystallized to enlarge the size of the grains so that they are visible to the unaided human eye.

21 Claims, 3 Drawing Sheets

U.S. PATENT DOCUMENTS

| | | | |
|---|---|---|---|
| 4,680,275 A * | 7/1987 | Wagner et al. | 436/518 |
| 5,291,560 A | 3/1994 | Daugman | |
| 6,602,578 B1 | 8/2003 | Tompkin et al. | |
| 6,870,678 B2 | 3/2005 | Tompkin et al. | |
| 6,909,547 B2 | 6/2005 | Weiteneder et al. | |
| 7,401,817 B2 * | 7/2008 | Muller-Rees et al. | 283/72 |
| 2003/0173539 A1 | 9/2003 | Muller-Rees et al. | |
| 2005/0017082 A1 * | 1/2005 | Moran et al. | 235/493 |
| 2005/0212183 A1 * | 9/2005 | Busch et al. | 264/509 |
| 2008/0106725 A1 * | 5/2008 | Schuetzmann et al. | 356/71 |

FOREIGN PATENT DOCUMENTS

| | | |
|---|---|---|
| ES | 2099012 A2 * | 5/1997 |
| GB | 2 324 065 | 10/1998 |
| WO | WO 97/40464 | 10/1997 |
| WO | WO 02/50790 | 6/2002 |
| WO | WO 03/091316 | 11/2003 |
| WO | WO 2005/005727 | 1/2005 |

OTHER PUBLICATIONS

Hardin, "Optical tricks designed to foil counterfeiters", http://www.spie.org/web/oer/november/nov99/cover2.html, retrieved Jun. 23, 2005.

William D. Callister, "Materials Science and Engineering—An Introduction", John Wiley & Sons, New York, p. 173 (2000).

* cited by examiner

UNIQUE LABEL FOR INDENTIFICATION OR SECURITY SYSTEM

CROSS-REFERENCE TO RELATED APPLICATIONS

This application is a filing under 35 U.S.C. §371 of PCT/US2006/025476 filed with the U.S. Receiving Office on Jun. 26, 2006, which claims priority to U.S. Ser. No. 60/694,931, filed Jun. 29, 2005.

FIELD OF THE INVENTION

The present invention relates to labels for security or identification systems and uses thereof.

BACKGROUND OF THE INVENTION

Security or identification markers are provided to enable validation of an item. The need for security or identification markers for valuable items is well-known. Banknotes typically include advanced security features, such as watermarks, fluorescent inks and holograms. However, with advances in copying technology it is becoming harder to install security features that are difficult to counterfeit, quick and easy to detect in situ, and cheap enough to mass produce.

Chemical and biochemical labels or tags are added to items as markers that can be detected to validate these items. However, validation typically involves removal of the marker from the item before analysis can be carried out. This is both time-consuming and expensive, rendering such markers inappropriate for on-line, high-speed examination.

Optical-based techniques have been used for the encoding of a range of products. One widely-employed optical labeling strategy uses fluorescent labels, the material of which emits light when excited by radiation of a particular wavelength. An example of a particular type of fluorescent material is described in EP 1 491 350 to NCR International, Inc.

Another frequently used marker is a security hologram. Holograms are records of an interference pattern formed by light at a recording location. Holograms can be applied to an item to prevent or reduce the counterfeiting of the item and may be used to authenticate an item because the three-dimensional image which they provide is difficult to reproduce. Examples of holograms are described in WO 97/40464 to Advanced Deposition Technologies, Inc.

All of the markers described above are expensive and complicated to produce if they are designed as unique pieces. However, if they are mass produced cheaply, they are no longer unique pieces. Therefore, there is a need for unique security and authenticating markers that are inexpensive to produce yet difficult to copy.

It is an object of the invention to provide more cost-effective, unique labels for security or identification systems.

It is a further object of the invention to provide a method and systems for authenticating an item containing a security or authentication label.

BRIEF SUMMARY OF THE INVENTION

Unique labels for security or identification purposes, methods of making the labels and uses for the labels are described herein. The label is formed from one or more crystalline materials, optionally in combination with a non-crystalline material, or from a combination of polymers, and has a unique, detectable pattern. In one embodiment, the label is formed from a crystalline material, preferably a metallic material, which naturally contains a unique grain structure, with unique reflective properties. In a preferred embodiment, the label is formed of a metallic material that has been recrystallized to enlarge the size of the grains so that they are visible to the unaided human eye. In another embodiment, the label is formed from a combination of two or more polymers, which are mixed together at elevated temperatures and/or in solvents and form a unique pattern upon removal of the solvent and/or cooling. Optionally, the label contains an identifier in the form of words, numbers, or letters, or a combination thereof. The label can be placed on any item or document. Following manufacture of the label, it is imaged with a particular light source or combination of light sources at one or more imaging angles; the label is numbered; and data describing the image, angle data and number are stored. In an alternative embodiment, the pattern may be discernable by applying a liquid or vapor to the surface. In this embodiment, following manufacturing a liquid or vapor is applied to the surface and the surface is imaged with a particular light source at one or more angles; the label is numbered; and data describing the liquid or vapor, image, angle data and number are stored. Preferably the data includes a stored image. In the preferred use of the label and security system, this information is only known by the end user of the identification system. To verify the authenticity of the labeled item, the label is imaged at the same angles as the stored data and compared to the stored image using pattern-recognition software.

BRIEF DESCRIPTION OF THE DRAWINGS

FIG. 3A shows the spherulitic patterns resulting when the crystal growth was conducted for 3 minutes. FIG. 3B shows the spherulitic patterns resulting when the crystal growth was conducted for 5 minutes. Each figure contains two optical micrographs from two different sections of the polymer films.

DETAILED DESCRIPTION OF THE INVENTION

I. Definitions

Figure 1:
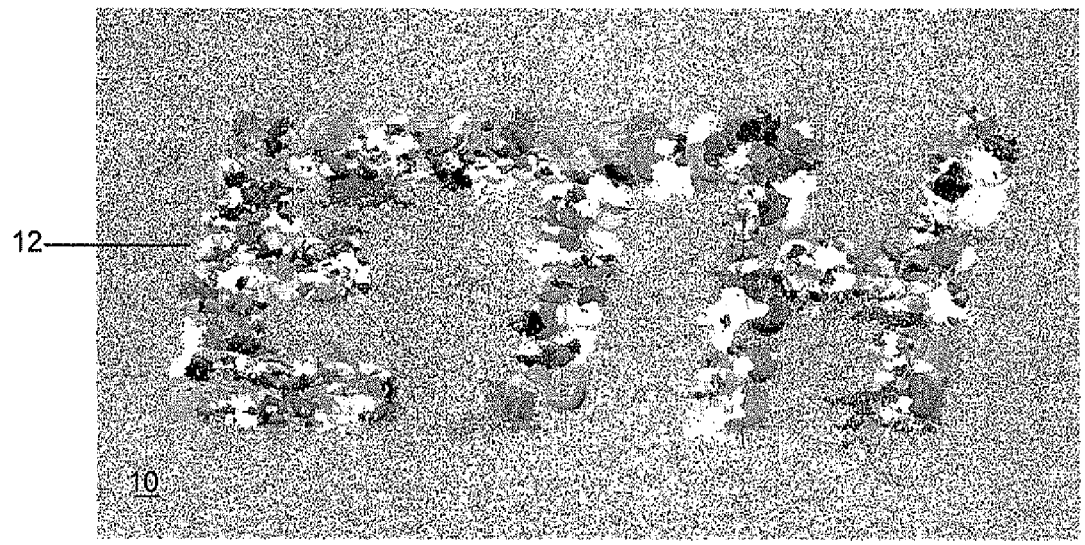
FIG. 1 shows an example of a metallic label, in which an identifier has been added, in this case, the acronym 'ETH'.

As generally used herein "label" means the solid material having a unique image or pattern.

As generally used herein "identifier" means a design, letters, numbers, or combination thereof.

As generally used herein "plastic deformation" means permanent distortion of a material under the action of applied stresses, such as rolling, forging, hammering, drawing, or embossing.

As generally used herein "cold worked" means plastic deformation at a temperature sufficiently low to create strain hardening (work-hardening). Typically the temperature is standard ambient temperature.

As generally used herein "recrystallization" means a process whereby a distorted grain structure of cold worked metals is replaced by a new, strain-free grain structure as a result of annealing above a specific minimum temperature for a specific time.

As generally used herein "additive" refers to a minor component added to a material or a mixture of materials, which modifies the properties of the material or a component of the mixture.

As generally used herein "crystalline material" refers to a solid material that contains regular and repeating atomic or molecular arrangements such that long-range order is established within the structure. The order can readily be detected with techniques such as polarized optical microscopy, X-ray diffraction, thermal analysis, picnometry and spectroscopy.

The terms "crystalline polymers" and "semi-crystalline polymers" are used interchangeably herein to refer to those polymers that show crystalline order of the chain molecules. This can readily be detected with techniques such as polarized optical microscopy, X-ray diffraction, thermal analysis, picnometry, and spectroscopy. Most polymers do not form solids that are fully ordered (100% crystalline), and typically contain a fraction of unordered, amorphous material (0% crystalline). This fraction can vary widely, depending on the chemical composition of the polymers and the conditions under which they are processed. Common crystalline polymers exhibit a degree of crystallinity, typically exceeding about 5% crystalline, although lower values are known, more often greater than about 10% crystalline and most often greater than 20% crystalline. Common polymers typically exhibit degrees of crystallinity of less then 95% crystalline, more often less than 85% crystalline and most often less than 80% crystalline. Detailed descriptions of methods to determine the degree of crystallinity of polymers can be found in standard references, such as Macromolecular Physics, Vol. 1, B. Wunderlich, Academic Press, New York, 1983.

The terms "crystals", "spherulites", and "grains" are used interchangeably to refer to entities that contain atoms or molecules or parts thereof that are ordered in a regular, repeating pattern extending in all three spatial dimensions.

As generally used herein "demixing" or "demix" refers to a process in which two or more polymers separate into discrete domains or regions.

II. Labels

Labels, also commonly referred to as markers, tags, or taggants, for security, authentication, or identification purposes are described herein. The labels are formed from a material that is a solid at room temperature and are typically in the form of a plate, sheet or foil. Suitable materials for forming the labels include crystalline materials, optionally in combination with a non-crystalline material, and combinations of polymers. Optionally, the label (10) contains an identifier (12) or is in the shape of an identifier (see e.g. FIG. 1). The label is in a form suitable for attachment to an item or document.

The label may be used alone. Optionally, the label is attached to a substrate, which is placed on an item or document. Suitable substrates include silicon chips, metallic materials, polymeric materials, fabrics, paper, and/or adhesives.

The labels described herein have unique patterns that are formed by the sizes and shapes of the grains in a crystalline material and/or the pattern of the polymers following mixing and demixing of a polymer mixture. The contrast pattern can be dependant on the given position of light and observation. The pattern, including the dimensions of the grey values of the pattern, can be dependent on the observation conditions and varies by viewing the pattern at different angles about an axis in the plane of the area in which the label is placed.

a. Materials i. Crystalline Materials

The label can be formed from any crystalline material that is solid at room temperature, such as a metal or alloy, ceramic, or crystalline polymer. In a preferred embodiment, the material is a metal or alloy. In a solid crystalline material, the grain's size and shape, and its direction and reflective ability are unique, comparable to a fingerprint or the iris of an eye. The grain structures of two pieces of a crystalline material, even if they are the same material, are not alike. The shape, arrangement and reflection characteristics of the grains cannot be reproduced. In one embodiment, useful for small labels that are viewed using a light, optical, or electron microscope, the grain structure has not been altered to enlarge the grains. In another embodiment, the grain structure of the crystalline material has been altered to enlarge the grains so that they are visible to the unaided human eye.

Suitable metals include, but are not limited to, metals that are crystalline at room temperature such as aluminum, magnesium, and transition metals such as scandium, titanium, vanadium, chromium, manganese, iron, cobalt, nickel, copper, zinc, yttrium, zirconium, niobium, molybdenum, palladium, silver, indium, tin, gold, platinum, iridium, osmium, tungsten, and mixtures and alloys thereof. In the preferred embodiment, the metal is aluminum or copper, or an alloy thereof. The native grain size in metallic materials typically ranges from 10 to 100 microns. In the preferred embodiment, the grain structure of the metallic material has been altered by mechanical-thermal treatment in such a way that an optically detectable grain pattern emerges on its surface. To make the grain structure visible to the unaided human eye, the grain structure should typically be enlarged by a factor of 10 to 10,000, depending upon the size of the native grain structure. Preferably the grain structure has been enlarged so the resulting grains are at least 10 times larger than the native grain size and up to 10,000 times larger than the native grain size. Preferably, the grain size ranges from 0.5 mm to 10 mm.

Suitable crystalline polymers include, but are not limited to, polyolefins, such as polyethylene; isotactic polypropylene; polyamides, such as nylon 6, nylon 6.6, nylon 12 and copolymers thereof; polyesters, such as poly(ethylene terephthalate); and poly(oxymethylene). The size of crystalline grains in polymers that are capable of crystallizing strongly depends on the rate at which the polymers are solidified. Higher cooling rates generally lead to the formation of finer crystalline structures, while slower cooling rates generally lead to the formation of coarser crystalline structures. Also, the addition of nucleating agents, i.e. additives that promote the rate of crystallization of the polymer, leads to finer grain structures compared to the grain structures for the same polymer solidified under the same conditions in the absence of the nucleating agent. Unique patterns can be created, for instance, by first rapidly cooling or quenching a polymer melt to yield a crystalline polymer with a fine-grained structure. However, if the polymer melt is cooled too quickly to a temperature below the glass transition temperature, no crystalline structure results, i.e. an amorphous polymeric material is formed. Subsequent local heating, also referred to as annealing, of such materials at temperatures below the melting temperature, but above the glass transition temperature of the polymer, causes crystal growth and coarsening only in those parts that are heated, resulting in the formation of unique patterns. Crystalline materials having smaller grains can be formed from polymers having coarse-grained crystalline structures by locally melting the material, followed by rapid cooling, which yields crystalline structures of smaller characteristic length scales. The grain size of the polymeric materials can vary from nanometers to millimeters.

ii. Polymeric Materials

In one embodiment, the label contains two or more polymers. The polymers may be amorphous or crystalline. Alternatively at least one polymer may be combined with a crystalline, non-polymeric material.

Some polymers mix together at elevated temperatures and/or in solvents in which the different polymers co-dissolve. Subsequently, upon lowering the temperature or removal of the solvent, the polymers demix, producing a material with different regions or domains arranged in a unique pattern. Remixing and demixing the same materials always results in different patterns. Thus these patterns are impossible to reproduce. Similarly, mixing of polymers that are not miscible in the liquid phase always results in materials with unique, irreproducible patterns.

The nature of the patterns can be influenced by various processing parameters and additives, such as surfactants, dyes, pigments, and nucleating agents. Typically, longer demixing times yield coarser patterns, while longer mixing times yield patterns with smaller structures. Addition of molecules that are partially miscible with some or all of the different polymers leads to the formation of patterns of finer structures. Also, adding nucleating agents to crystalline polymers results in smaller grains. The domains in the unique patterns have a typical size ranging from greater than 100 nm to less than the length of the label. The preferred size for the domains ranges from greater then 0.5 µm to less than 10 mm, and the most preferred size for the domains ranges from greater than 1 µm to less than 5 mm.

Suitable polymers include all polymers that can be molten and/or dissolved in one or more solvents. Suitable polymers can be found in the "Polymer Handbook", J. Brandrup and E. H. Immergut, $3^{rd}$ Edition, Wiley, N.Y. (1999). The different polymers may be amorphous, i.e. non-crystalline, or crystalline. Examples of useful amorphous polymers include, but are not limited to, polyacrylates, such as poly(methyl methacrylate), atactic polystyrenes, polycarbonates, polyisoprenes, polybutadienes, amorphous nylons, polyvinyl chloride, acrylonitrile-butadiene-styrene (ABS), styrene acrylonitrile copolymer (SAN), and polyethersulfone. Examples of useful crystalline polymers include, but are not limited to, polyolefins, such as polyethylene, isotactic polypropylene, syndiotactic polystyrene, polyamides, such as nylon 6, nylon 6.6, nylon 12 and copolymers thereof, polyesters, such as poly(ethylene terephthalate) and poly(butylene terephthalate), poly(oxymethylene), polyketones, polyphenylene sulfide, polytetrafluoroethylene, poly(p-phenyleneterephthalamide) (Kevlar®), and polyetheretherketone. In one preferred embodiment, the material contains at least two amorphous polymers, wherein at least one polymer is a polyacrylate and the second polymer is a polystyrene or a polycarbonate.

In order to form a detectable pattern, the different polymers have different characteristics that are suitable for detection by one or more methods. Those skilled in the art of polymer products are able to select the appropriate combination of polymers most suited for the particular pattern and detection method. The polymers are selected so that at least one of the polymers has different properties than the other polymer(s) that are detectable using different types of light and/or liquids. Some of the different properties include grain structure, crystallinity, photoluminescence, fluorescence, refractive index, surface energy, and hydrophilicity/hydrophobicity.

The different types of light that can be used to detect the different properties include ultraviolet, infra-red, and visible light. The different liquids that can be applied to the surface of the labels to detect the unique patterns include polar liquids such as water and alcohols, and non-polar liquids such as alkanes and paraffin oil.

For example, in one embodiment at least one polymer is an amorphous polymer, and at least one second polymer is a crystalline polymer. Such a combination of polymers can readily be analyzed with polarized visible light under crossed polarizers. The amorphous polymer appears dark and the crystalline or semi-crystalline polymer appears bright. As noted above with respect to all crystalline materials, the crystalline polymer itself contains a unique crystalline morphology. Thus, when combined with an amorphous polymer, the crystalline regions of the resulting material are composed of unique domains with unique sub-patterns.

In another embodiment, one of the polymers is photoluminescent or fluorescent. Thus, when combined with one or more non-photoluminescent or non-fluorescent phase-separated amorphous or crystalline polymers, the photoluminescent or fluorescent polymer phase emits light when excited with electromagnetic waves (light) of a suitable wavelength.

In another embodiment, two or more of the polymers are crystalline polymers. As noted above, all crystalline materials have unique grain structures. Thus when two or more crystalline polymers are combined, the resulting material has a unique pattern with different regions formed of each crystalline polymer, where each region is composed of grains with unique sub-patterns.

In another embodiment, the two or more of the polymers are amorphous polymers, where at least one of the polymers has a different refractive index than the other polymer(s). Irregular patterns are formed with mixtures of amorphous polymers. The patterns can be detected using visible light when the different polymers have different refractive indices. This method can also be employed to reveal patterns of the amorphous/crystalline and crystalline/crystalline polymer combinations.

In another embodiment, two or more polymers that have different surface energies are selected, mixed together, and demixed to form a unique pattern. For example a first polymer may be a polar polymer, such as poly(methyl methacrylate), polycarbonates, amorphous nylons, polyvinyl chloride, acrylonitrile-butadiene-styrene (ABS), styrene acrylonitrile copolymer (SAN), polyethersulfone, polyamides, such as nylon 6, nylon 6.6, nylon 12 and copolymers thereof, polyesters, such as poly(ethylene terephthalate) and poly(butylene terephthalate), poly(oxymethylene), polyketones, polyphenylene sulfide, poly(tetrafluoroethylene), polyetheretherketone, or poly(p-phenyleneterephthalamide) (Kevlar®) and a second polymer may be less polar than the first polymer or a hydrophobic polymer, such as atactic polystyrene, syndiotactic polystyrene, polyisoprenes, polybutadienes, or polyolefins, such as polyethylene and isotactic polypropylene. In this embodiment, the pattern is visible when it is contacted with a suitable liquid. This will cause the liquid to adopt a pattern similar to the pattern of the polymers, as it preferentially wets the polymer of comparable surface tension. The different liquids that can be applied to the surface of the labels to detect the unique patterns include polar liquids such as water and alcohols, and non-polar liquids such as alkanes and paraffin oil. For example a polar liquid, will contact the regions containing the polar polymer and avoid the regions containing a hydrophobic material.

b. Additives

The crystalline materials or the polymers may include one or more additives. For example, nucleating agents may be added to the crystalline materials. Suitable nucleating agents include, but are not limited to, inorganic substances such as talc, silicates, calcium carbonates, sodium phosphates, and phosphate ester salts; organic materials such as polyesters, diacetals, dibenzylidene sorbitols, sodium or lithium benzoates, metal salts of carboxylic acids or alkyl-substituted derivatives thereof such as salts of stearic acids, adipic acid and sebacic acid; chromium p-tert-butyl benzoate; organic pigments such as isoindoline, laked azo, phthalocyanine, chlorinated copper phthalocyanine; aluminum monophenyl acetate; 1,3,5-benzene trisamides such as 1,3,5-benzene tert-butyl trisamide; 1,3,5-benzene tricarboxylic acids such as 1,3,5-benzene tert-butyl tricarboxylic acid; N,N',N"-tris-isopentyl-1,3,5-benzene-tricarboxamide; the calcium salt of suberic acid γ-quinacridone; and N,N'-dicyclohexyl-2,6-naphthalene carboxamide. Preferred nucleating agents are 1,3:2,4-bis-(3,4-dimethyl benzylidene) sorbitol and 1,3,5-benzene tert-butyl trisamide.

Optionally, one or more of the polymers is combined with one or more additives for improving the detection of the unique pattern, such as a photosensitive dye, pigment, photochromic or thermochromic dye, or magnetic particles. Suitable dyes include fluorescent dyes, dyes that absorb light in the visible wavelength range, dyes that emit light in the visible wavelength range when contacted with visible or ultraviolet light, and dyes that emit infra-red light when contacted with infra-red light. Suitable fluorescent dyes include, but are not limited to, fluorescein isothiocyanate, Texas red, monomethine cyanine dyes such as thiazole orange, and derivatives of coumarin. Suitable examples of infrared dyes include near infrared dyes (NIR) such as polymethine dyes, substituted phthalocyanines, and benzopyrylium based NIR dyes. Additional NIR dyes are available from American Dye Source, Inc. (Quebec, Canada) including water-soluble NIR dyes, solvent-soluble NIR dyes, and metal-complex NIR dyes. Suitable photochromic dyes include, but are not limited to, dyes available from James Robinson, Ltd. (West Yorkshire, England) under the name Reversacols™. Other photochromic dyes include triarylmethanes, stilbenes, azastilbenes, nitrones, fulgides, spiropyrans, naphthopyrans, spirooxazines. Suitable classes of thermocliromic dyes include, but are not limited to, cyanobiphenyls, and leuco dyes such as spirolactones, fluorans, spiropyrans, and fulgides. Thermochromic dyes are available from Clark R&D Ltd. (Rolling Meadows, Ill.) under the trademark ColorTell™.

Suitable pigments include organic and inorganic pigments. Organic pigments include indigo, madder lake, Phthalo Green PG 7; Phthalo Green PG 36, yellowish; Phthalo Blue PB 15; Phthalo Blue PB 15.3, royal blue; Phthalo Blue PB 15.6, reddish; Indanthrone Blue PB 60; Irgazine Orange PO 73; Irgazine Scarlet PR 255; Irgazine Red PR 254; Irgazine Ruby PR 264; Scarlet Red PR 168; Permanent Yellow light PY 151; Permanent Yellow medium PY 154; Permanent Yellow, Hansa deep PY 6; Irgazine Yellow Light PY 129, greenish-gold; Permanent Yellow; Indian Yellow PG 10; Quindo Pink PR 122; Quindo Red R 6713; Dioxazine Violet PV 37; Purple Red PR 175, brownish; Gubbio Red PBr 23; Perylene Maroon PR 179; Cinquasia Gold PO 49; Cinquasia Gold PO 49; Cinquasia Red-gold PO 48; Alizarine Crimson PR 83, light red; Alizarine Crimson PR 83, deep; Arylide Yellow (Hansa) PY 74; Irgazine Yellow PY 110, deep; Thioindigoid Red PV 19; Cinquasia Violet PV 19; Alizarine Violet PV 5; Isoindolor Orange PO 61. Inorganic pigments include titanium dioxide ($TiO_2$), iron oxides, ultramarine blue pigments, manganese violet pigments, earth colors, azurite, and electronic and magnetic pigments such as complex oxides (containing more than one metal ion). A preferred white pigment is titanium dioxide. Upon irradiation with suitable wavelength of light, the polymers containing the dye or pigment are visible, and thus the pattern is visible.

Additives may be mixed with one or more of the polymers in any suitable amount. In one preferred embodiment, at least one of the polymers contains between about 0.0001 and 15 weight percent of one or more additives, preferably between about 0.001 and 10 weight percent, most preferably between about 0.01 and 5 weight percent.

c. Size and Shape

The label may be of any shape or size and have a wide range of thicknesses. Typically the label is about 0.2 mm to 1 cm thick, preferably from about 0.3 mm to 3 mm thick. However, the label may be thinner. In one embodiment, the grain structure is visible to the unaided human eye. These labels are typically greater than or equal to 0.5 cm in length and/or width or diameter. In another embodiment, the labels are smaller, with lengths and/or widths or diameters from 1 micron up to few millimeters. These labels may be viewed using a light optical or electron microscope.

Crystalline materials naturally contain a grain structure, which can be visualized either with light optical microscopy (LOM) or scanning electron microscopy (SEM). In one embodiment, the grain structure in the "native" material is not modified to enlarge the grain structure, and the unmodified grain structure is viewed using LOM or SEM. This embodiment is particularly useful for forming very small labels, such as those from 1 micron up to 10 mm in length and/or width or diameter, preferably from 1 micron to 100 microns length and/or width or diameter. Such small labels are particularly useful as "hidden" security devices. In one embodiment, the label is so small that it is not visible to the unaided human eye. Although these labels are inexpensive to manufacture, the verification method requires a microscope, such as a SEM, which can typically be found in a forensic lab.

The manner in which the pattern formed by mixing and demixing the polymers may be visualized is a function of the polymers and/or additives used to form the label. In one embodiment, the label is at least partially transparent and the unique pattern contains domains or grains that are sufficiently large to be detected with the naked eye. This label can be viewed in transmitted light without an optical microscope. In another embodiment, the label is at least partially transparent and the unique pattern contains domains or grains that are too small to be detected with the naked eye, such as smaller than about 5 micrometers. This label can be viewed with an optical microscope.

In another preferred embodiment, at least one of the polymers in the pattern is photoluminescent, or contains a photoluminescent dye, that upon irradiation emits visible light which permits detection of the pattern, depending on the size of the domains, with (small domains, e.g. less than 5 microns) or without (large domains) an optical microscope. The dye(s) can also emit light in the ultraviolet and/or infra-red region of the electromagnetic spectrum, which can be measured using various types of spectroscopy, such as UV-Vis spectroscopy, Raman spectroscopy or Infrared spectroscopy. Emission from fluorescent dyes can be measured using a fluorimeter.

In yet another embodiment, at least one of the polymers in the pattern contains a thermochromic dye that upon heating changes color, which permits detection of the pattern, depending on the domain size, with or without an optical microscope.

In yet another embodiment, at least one of the polymers in the pattern contains a photochromic dye that upon exposure to radiation (i.e. light) changes color, which permits detection of the pattern, depending on the domain size, with or without an optical microscope.

In still another embodiment, at least one of the polymers in the pattern contains magnetic particles to which oppositely charged materials, such as in the form of a fine powder (e.g. a metal powder), are attracted and adopt a similar pattern when placed on the label. The pattern can then be detected, depending on the domain size, with or without an optical microscope.

In yet another embodiment, the label contains a unique pattern composed of a hydrophobic polymer and a more hydrophilic polymer which is revealed by exposing it to water vapor, e.g. by breathing onto it, or applying a liquid to it. Following manufacturing, a liquid or vapor is applied to the surface and the surface is imaged with a particular light source at one or more angles; the label is numbered; and data describing the liquid or vapor applied, image, angle data and number are stored. The pattern can be detected following the application of the liquid or vapor depending on the domain size, with or without an optical microscope.

III. Methods of Enlarging the Grain Structure for Metallic Labels

Formation and enlargement of the grain structure occurs in metallic materials using recrystallization. See William D. Callister, "Materials Science and Engineering—An Introduction", John Wiley & Sons, New York, p. 173 (2000). A defect density, also known as dislocation density, is first introduced into the metallic material by cold working. Then recrystallization is provoked by high-temperature annealing. In general, as the degree of cold working is increased, the metal recrystallizes more readily, i.e. at a lower temperature. At smaller plastic deformations, fewer nuclei are created per unit volume. The smaller number of nuclei leads to a coarser recrystallized grain size. If the amount of plastic deformation is further reduced, a "critical deformation level" is reached. The critical deformation level is the strain just necessary to initiate recrystallization. Just above this critical strain level the grain size can be extremely large. The critical deformation level is a function of both the material used and the annealing temperature and can be determined by looking at standard references, such as E. Hatch, "Aluminum—Properties and Physical Metallurgy", ASM Int. (1984). The critical deformation level is typically a few percent of the original thickness, such as from 1 to 10% of the original thickness.

a. Introduction of the Defect Density

The defect density may be introduced in the metallic material by rolling, forging, hammering, drawing, or embossing using an applied strain above the critical deformation level. In localized zones, the defect density may be introduced by using a template, or by a local compression method, such as creating indentations with spiky tools. In one embodiment, prior to introduction of the critical defect density, the material is subjected to a plastic strain below the critical deformation level. For example, using the rolling technique, first the material is fed through the rollers at a subcritical deformation level. Then the material is fed through the rollers with a template or foil above the critical deformation level. Optionally, the template contains a design, numbers or letters.

b. Annealing

Suitable annealing temperatures are dependent on the type of metallic material and the amount of applied stress that caused the deformation. The annealing temperatures are typically over 100° C. For example, typical annealing temperatures for pure aluminum sheet range from 600-650° C., when a plastic strain of 2-6% is applied (See E. Hatch, "Aluminum—Properties and Physical Metallurgy", ASM Int. (1984)). At higher annealing temperatures, less time is required during the annealing step for recrystallization. At lower annealing temperatures, more time is required during the annealing step for recrystallization. Following annealing, the grains reflect light in different ways at different angles.

c. Chemical Etching

A plastically deformed and annealed sample frequently will not exhibit its microstructure because light is uniformly reflected. To make the recrystallized grain structure visible, a surface treatment using an appropriate chemical reagent has to be applied in a procedure termed "etching". The atoms at the different grains and at the grain boundary have different chemical reactivities. During attack by a chemical reagent, these grains dissolve at different rates. Consequently, the grains become discernible because they reflect light at different angles. The etching reagents are selected based on the metallic material used. See ASM Handbook, Vol. 9, Metallography and Microstructures, Materials Park, Ohio (2004).

D. Adding an Identifier

Optionally, the label also contains an identifier. A design, letters, or numbers, or a combination thereof can be incorporated into the material by means of different levels of local plastic deformation, following the annealing step, or following the chemical etching step. The identifier may be a brand name or logo.

IV. Methods of making Polymeric Labels

The labels can be produced using more than one polymer by dissolution processes or melting processes.

A. Melting

In one method, two or more incompatible polymers are selected and blended above the melting or softening temperature of at least one of the polymers in a single- or twin-screw extruder or static mixer to form a multi-phase molten polymer blend, then the multi-phase molten polymer blend is discharged through a die and cooled to form a solid product, such as a sheet, film, profile, or tube, with a unique pattern. Then the individual labels are cut, stamped out or otherwise collected. Typically, the blending step is carried out at temperatures above 50° C. and below 350° C., more preferably above 75° C. and below 325° C., most preferably above 100° C. and below 300° C.

The labels can also be produced, for instance, by blending polymers at elevated temperatures where they form a homogeneous (one-phase) molten polymer blend, for instance in an extruder or other mixing device. After blending, the molten polymer blend is discharged through a die and cooled to form a solid product, such as a sheet, film, profile, or tube, with a unique pattern. Then the individual labels are cut, stamped out or otherwise collected. Separation into one or more phases, i.e. demixing, in a unique pattern is caused during cooling by liquid-liquid spinodal or binodal phase separation of the polymers. Guidelines for the temperatures at which the blending, cooling, and demixing processes occur can be found in, for example, "Polymer Phase Diagrams—A Textbook, R. Koningsveld, W. H. Stockmayer and E. Nies, Oxford University Press, Oxford (2001). In a preferred embodiment, the label is formed by mixing two incompatible amorphous polymers in their molten phase, where one of the polymers contains an additive, preferably a photoactive additive. Then the polymers are extruded to form a sheet. Then a label is cut from the sheet, and optionally stamped with an identifier, or otherwise collected.

Polymer labels can also be made by injection molding. Pre-compounded polymer blends can be used, or the different polymers can be directly fed into the injection-molding means. In both cases, unique patterns arise from the incompatibility of the different polymers.

B. Dissolution

Polymer labels can be made by mixing different polymers by co-dissolving them in a suitable solvent, optionally in combination with heating, then casting or extruding the solution in the form of a sheet, film or other solid product, and subsequently removing the solvent, such as by evaporation or extraction, and demixing the polymers. Suitable solvents and extraction liquids can be found in the Polymer Handbook, J. Brandrup and E. H. Immergut, $3^{rd}$ Edition, Wiley, N.Y. (1999).

C. Annealing

Optionally, the unique patterns may be coarsened or enlarged by annealing the material after forming the solid product. For example, a sheet, film or other solid product can be kept at elevated temperatures for a suitable period of time for further segregation of the polymers to occur. Generally, higher annealing temperatures and longer annealing times lead to coarser patterns, i.e. patterns with regions having larger characteristic lengths. Typically annealing is carried out at temperatures close to the softening temperature of at least one of the polymers. These temperatures are well known and can be found in the Polymer Handbook, J. Brandrup and E. H. Immergut, $3^{rd}$ Edition, Wiley, N.Y. (1999).

D. Adding an Identifier

Optionally, the label also contains an identifier. A design, letters, or numbers, or a combination thereof can be incorporated into the material by means of different levels of local plastic deformation. The identifier may be a brand name or logo. In one embodiment, the identifier is added following an annealing step.

V. Uses for the Labels

The labels may be placed on or integrated into documents or other items, such as luxury or name-brand goods, to indicate that the document or item is authentic and to protect against forgery. Items on which the label may be used include financial instruments or value-bearing papers, such as currency, bank notes, credit cards, securities, bonds, and checks; personal identification cards, passports, documents, devices, and name-brand or luxury goods.

The labels can be used for any identification purpose where an item or person needs to be uniquely identified. For example in the case of a passport, the label in the form of a foil could be placed in a passport, after having been imaged and illuminated from a particular angle. The image, together with the angle information, would be recorded by the passport authority and assigned to an individual. Only the one specific foil present in the passport would pass the identification test, which would utilize a simple camera attached to a computer (with appropriate image analysis software) with a light source, both camera and light source being moveable to different angles relative to the surface of the foil.

In an alternative embodiment, a pattern on a label may be discernable by applying a liquid or vapor to the surface and comparing the pattern of the liquid or vapor with the stored pattern of the liquid or vapor previously applied to the label.

The labels could also be placed on goods to designate the source of the goods, and/or to indicate that they are genuine (e.g. "genuine parts"). The labels could be used with expensive items, such as luxury or name-brand goods, motorized vehicles, or with low-cost items, such as those sold in supermarkets. The inherently low cost for the mass production of these labels allows them to be used for low-cost items.

a. Methods for Verifying the Authenticity or Determining the Identity of Labeled Items or Documents Following manufacture of the label, the label is imaged with a particular combination of light source(s) at one or more imaging angles, the label is numbered, and the image, angle data and number stored. This information is only known by the end user of the identification system, such as the passport authority, if the label is placed in a passport, or a national bank, if the label is placed on a financial instrument. During verification, the optical angles used for the particular numbered label are provided, and the label is imaged at those angles. The optical detection system incorporates pattern recognition software similar to that used for iris recognition systems, but incorporates grayscales. Examples of iris recognition systems include those sold by IRIDIAN® Technologies, Inc. of Moorestown, N.J. and described in U.S. Pat. No. 5,291,560 to Daugman.

The optical detection system compares the image of the label with the stored images. The system can be designed to search for a perfect match, or to accept some discrepancy, such as a 90% or a 95% correlation between the current image and the stored image. This would allow for discrepancies due to wear and tear on the item or the presence of dirt.

Alternatively, the label can be imaged using a standard scanner. In this method, the optical recognition software would merely compare the stored scanned image with the image of the scanned label. This method is simpler than then angle-specific comparison, but lacks the added security of the angle-specific comparison method.

The likelihood of forgery of the label is very low. It is impossible to imitate the complexity of the natural grain structure of a crystalline material and the unique patterns formed with the combinations of polymers or combinations of crystalline materials and non-crystalline materials. Additionally when the angle-specific comparison method is used, another level of security is added. The forger does not know the angles at which the tag was imaged during manufacture because angle(s) at which the label was imaged are stored separate from the label. Thus the forger does not know which image of the label must be copied to produce a forged image.

b. Security Labeling System

The label may be a part of a security labeling system. The security labeling system contains stored data describing the unique pattern on the label and the label. The stored data may contain stored images, words, or numbers, or combinations thereof. Optionally, the stored data is written in assembly language or machine language.

The present invention will be further understood by reference to the following non-limiting examples.

EXAMPLES

Example 1

Metallic Label Containing Enlarged Grain Structure

A soft-annealed aluminum sheet (99.75% (weight) Aluminum) with dimensions of 100 mm long and 40 mm wide and 3 mm thick was cold rolled below the critical deformation degree, to a deformation degree of about 1% of the original thickness of the sheet. In a second pass of the rolling process, a steel foil with the shape of the letters "ETH" and a thickness of 0.1 mm was placed on the sheet. During this pass a local increase of plastic deformation takes place in the sheet under the steel foil to a deformation level of about 4% of the original thickness, i.e. above the critical deformation degree. Then, the sheet was annealed at 620° C. for 15 minutes, and recrystallization took place in the regions of higher deformation. Lastly, the grain structure was made visible by means of chemical etching, using an etching reagent containing 15 g sodium hydroxide in 100 mL distilled water.

The resulting label was scanned using a conventional office scanner (Canon 5000F) with a resolution of 2400 dpi to produce the image shown in FIG. 1. The image emerged via varied reflection of light on the grain surface, but is as such a unique piece.

Example 2

Polymeric Label Formed from Two Amorphous Polymers 10 grams of polycarbonate (Makrolono® LQ2847, Bayer Materials Science AG) was dissolved in 70 grams of tetrahydrofuran (THF) at 50° C. to form a 10 wt. % solution. 10 grams of poly(butyl methacrylate-co-methyl methacrylate) (Sigma-Aldrich Chem. Co., Inc.) was dissolved in 70 grams of tetrahydrofuran (THF) at 50° C. to form a 10 wt. % solution. The two solutions, in the amount of 5 ml, were mixed together in a separate flask. The resulting solution mixture containing the two co-dissolved polymers was cast onto a glass slide and allowed to dry.

The solvent was evaporated relatively fast (about 5 minutes) by placing the glass slide with the applied solution under a flow of air, or slowly (about 30 minutes) by confining the glass slide in a semi-closed environment provided by a Petri dish.

Figure 2A:
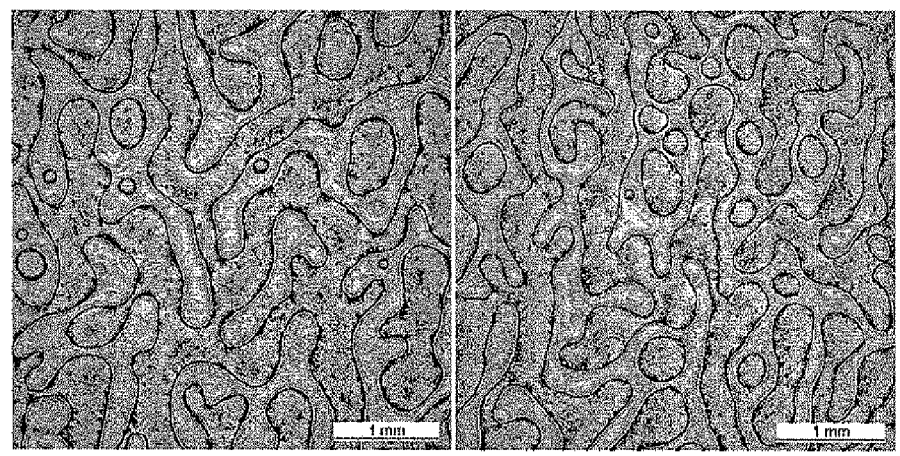
FIGS. 2A and 2B are optical micrographs showing pattern formation upon phase separation of a mixture of two amorphous polymers at relatively high rates of solvent evaporation (FIG. 2A) and relatively low rates of solvent evaporation (FIG. 2B). Each figure contains two optical micrographs from two different sections of the polymer films.
Figure 2B:
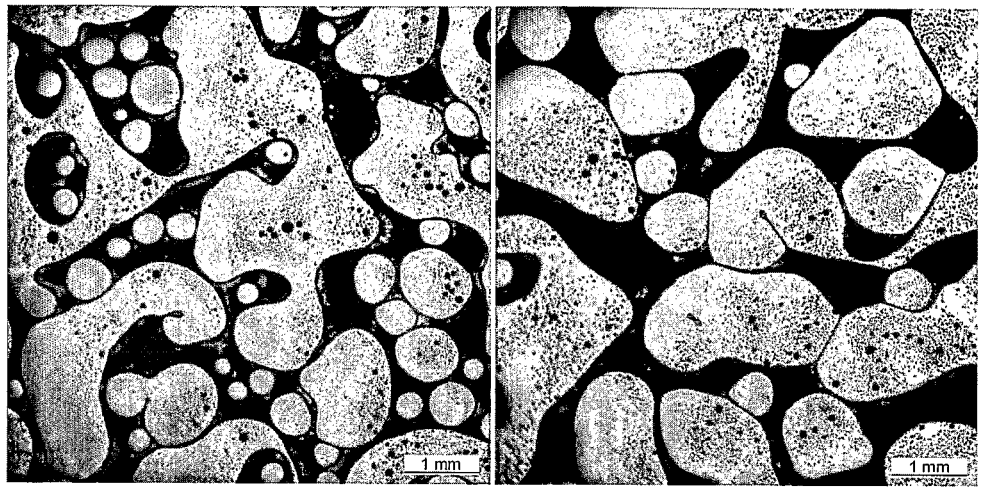

FIGS. 2A and 2B are optical micrographs taken with a Leica DMRX instrument under crossed polarizers. The scale bar represents 1 mm. FIG. 2A contains two optical micrographs of two different sections in the quickly dried, phase-separated polymer blend film. FIG. 2B contains tow optical micrographs of two different sections of the slowly dried, phase-separated polymer blend film. As shown in FIGS. 2A and 2B, different sections of the films have different, unique patterns. Repeating the above-described method lead to highly similar, but distinctly different patterns (not shown in the figures).

A comparison of FIG. 2A with FIG. 2B shows that a fast rate of evaporation leads to finer structures (FIG. 2A) than the coarser features obtained at the lower rate of evaporation (FIG. 2B). These results demonstrate that the rate of evaporation can be selected to adjust the sizes of the domains in the pattern to the desired size needed for a particular detection method.

Example 3

Polymeric Label Formed from Semicrystalline Polymer

A film of semicrystalline isotactic polypropylene (i-PP) (Moplen HP 500N, Basell N.V.) was prepared by pressing 5 g of the i-PP powder between two aluminum plates in a "hot" hydraulic press (Carver, Inc.) at 230° C. under a pressure of about 200 kPa. Next, the sample was quenched by placing it in a "cold" hydraulic press (Carver, Inc) operated at 10° C. and about 100 kPa. The resulting film had a thickness of about 75 micrometers. A section of the prepared film was then placed on a microscopy slide and introduced into a hot-stage for optical microscopy (FP82HT, Mettler-Toledo). The sample of i-PP film was heated to 180° C. to ensure complete melting of the film. The temperature was then set to 122° C. and the growth of crystals (spherulites) was monitored with the Leica DMRX microscope in transmission mode with a polarizer and a crossed quarter wave plate ($\lambda$=4). The spherulitic growth continued for 3 minutes, after which the sample was rapidly quenched in a beaker filled with ice and water. The same experimental procedure was repeated with a different sample of i-PP, this time, however, the crystal growth was conducted for 5 minutes.

Figure 3A:
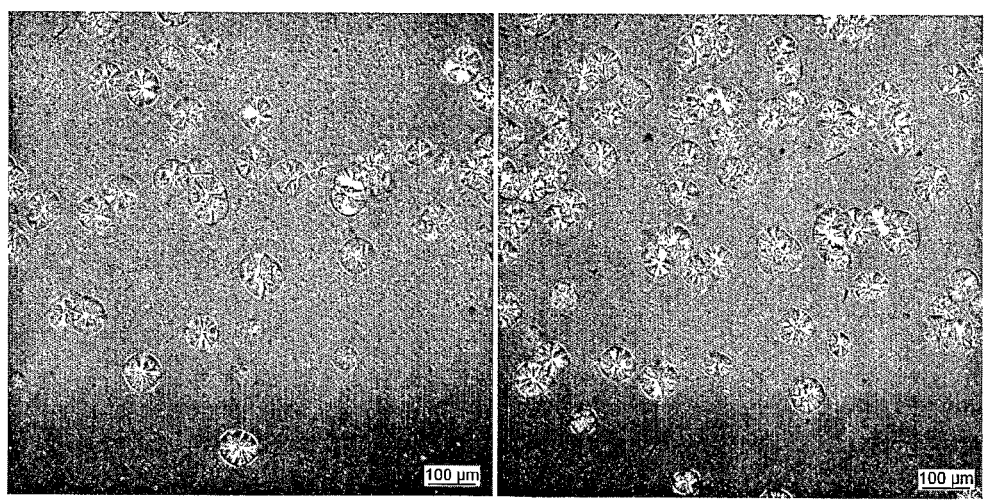
FIGS. 3A and 3B are optical micrographs showing pattern formation during crystal growth of a semi-crystalline polymer.
Figure 3B:
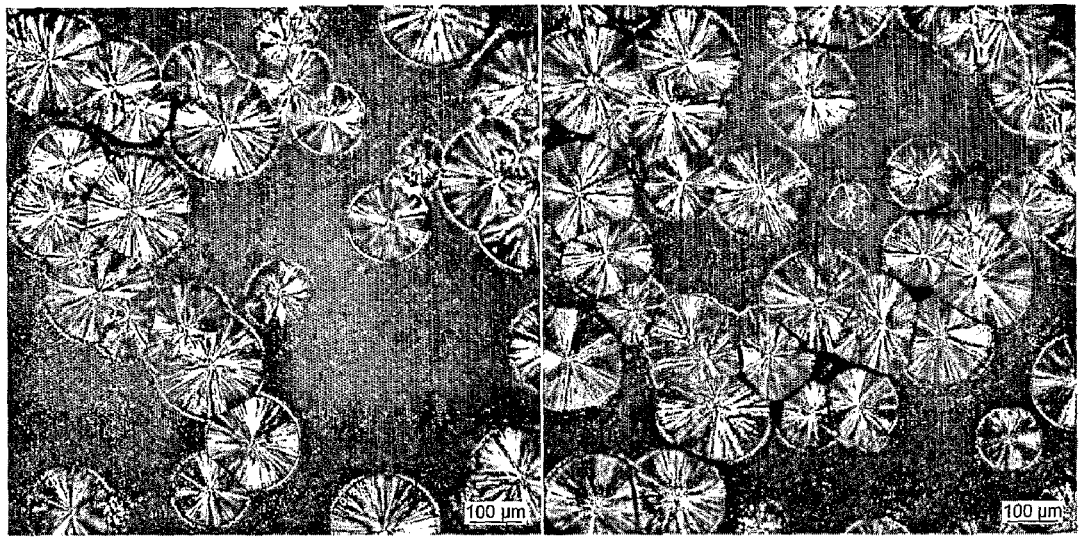

FIGS. 3A and 3B are optical micrographs, taken with a Leica DMRX microscope in transmission mode with a polarizer and a crossed quarter wave plate ($\lambda$=4), of the different areas of the i-PP film. The scale bar represents 0.1 mm. FIG. 3A shows the spherulitic patterns resulting when the crystal growth was conducted for 3 minutes. FIG. 3B shows the spherulitic patterns resulting when the crystal growth was conducted for 5 minutes.

As shown in FIGS. 3A and 3B, unique patterns of polymer crystal morphologies can be created of different sizes by cooling a single polymer melt under different cooling protocols. Different cooling protocols results in different crystal structures/sizes. Longer cooling times (e.g. 5 minutes), resulted in larger crystals (see FIG. 3B); while shorter cooling times (e.g. 3 minutes) produced smaller crystals (see FIG. 3A).

Example 4

Polymeric Label Formed from Semicrystalline Polymer and Amorphous Copolymer 2 g of semi-crystalline polyethylene oxide ("PEO") (weight average molecular weight Mw-200,000, Polysciences, Inc.) was added to 38 g of dimethylformamide (DMF) at 80° C. to form a 5 wt. % PEO solution. 5 g of amorphous poly(ethyl methacrylate-co-methyl acrylate) ("PEM-co-MA") (Sigma-Aldrich Chem. Co., Inc.) was added to 45 g of DMF to yield a 10 wt. % PEM-co-MA solution. The two solutions were then cooled to room temperature. A quantity of 5 ml of the PEO solution was then added to 50 ml of the PEM-co-MA solution to form a solution mixture. The resulting solution mixture was cast onto a glass slide and allowed to dry. The glass slide was then introduced into a hot-stage for optical microscopy (FP82HT, Mettler-Toledo); the stage was set to 100° C. Upon complete melting of the PEO crystallites, the stage was set to 25° C. and a cooling rate of 10° C./min.

Figure 4:
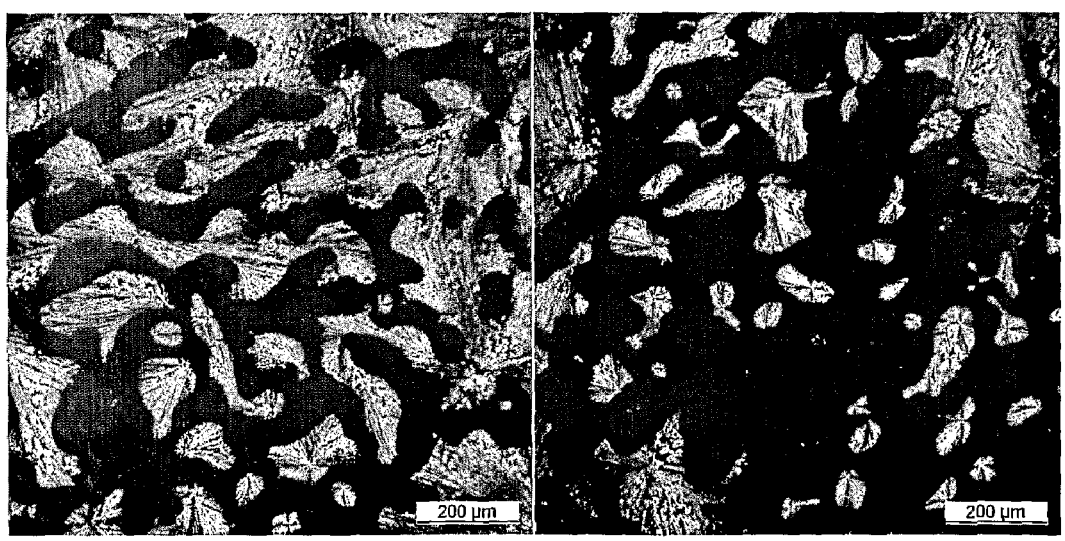
FIG. 4 contains two optical micrographs showing pattern formation upon phase separation of a mixture of an amorphous (black) and a semi-crystalline (white) polymer when viewed in cross-polarized light.

FIG. 4 contains two optical micrographs imaged with a Leica DMRX microscope in transmission mode with crossed polarizers. Each micrograph shows a different area of the resulting phase-separated polymer film. The scale bar represents 0.2 mm. The amorphous areas of PEM-co-MA appear black, while the spherulites of PEO appear white and show characteristic Maltese cross patterns.

It is understood that the disclosed invention is not limited to the particular methodology, protocols, and reagents described as these may vary. It is also to be understood that the terminology used herein is for the purpose of describing particular embodiments only, and is not intended to limit the scope of the present invention which will be limited only by the appended claims.

Those skilled in the art will recognize, or be able to ascertain using no more than routine experimentation, many equivalents to the specific embodiments of the invention described herein. Such equivalents are intended to be encompassed by the following claims.

We claim:

1. A security labeling system comprising
a label formed from solid material selected from the group consisting of crystalline materials, materials comprising a combination of a crystalline material and a non-crystalline material, materials comprising a combination of crystalline materials, and materials comprising at least two polymers that are phase separated, wherein the surface of the label comprises a unique pattern formed by the sizes and shapes of the grains in a crystalline material or the pattern of the polymers following mixing and demixing of the polymers, wherein the pattern varies by viewing the pattern at different angles about an axis in the plane of the area in which the label is placed, and
stored data comprising image data of the pattern on the label, data on the imaging angle, and the label number, wherein the data on the imaging angle is stored separately from the label.

2. The system of claim 1, wherein the crystalline material comprises an enlarged grain structure when compared to the native grain structure.

3. The system of claim 1, wherein the crystalline material comprises its native grain structure.

4. The system of claim 1, wherein the data is in a form selected from the group consisting of images, numbers, letters, and combinations thereof.

5. A method of verifying the authenticity of an item tagged with a security or identification label, comprising
imaging the label at one or more angles about an axis in the plane of the area in which the label is placed to form one or more stored images,
storing image data, data on the one or more imaging angles for the stored images, and the number of the label, wherein the data on the one or more imaging angles is stored separately from the label,
providing the data on the one or more imaging angles for the stored images,
imaging the label at the one or more imaging angles to form one or more comparison images, and
comparing the one or more comparison images to one or more stored images taken at the same angles as the one or more comparison images,
wherein the label is formed from a solid material selected from the group consisting of crystalline materials, materials comprising a combination of a crystalline material and a non-crystalline material, materials comprising a combination of crystalline materials, and materials comprising at least two polymers that are phase separated, wherein the surface of the label comprises a unique pattern formed by the sizes and shapes of the grains in a crystalline material or the pattern of the polymers following mixing and demixing of the polymers, wherein the pattern by viewing the astern at different angles about an axis in the plane of the area in which the label is placed.

6. The method of claim 5, the label has a length or width ranging from 0.1 mm to 1 cm.

7. The method of claim 5, wherein material is a crystalline material comprising an enlarged grain structure when compared to the native grain structure.

8. The method of claim 5, wherein the material is a crystalline material comprising its native grain structure.

9. The method of claim 5, wherein the item is selected from the group consisting of financial instruments, personal identification cards and documents, devices, and name-brand or luxury goods.

10. The method of claim 9, wherein the item is a financial instrument selected from the group consisting of currency, bank notes, credit cards, securities, bonds, and checks.

11. The method of claim 5, wherein the stored images and the comparison images are obtained using a seamier.

12. The method of claim 5, wherein the stored images and the comparison images are obtained using a light optical or scanning electron microscope.

13. The system of claim 1, wherein the label is on or in an item.

14. The system of claim 13, wherein the item is selected from the group consisting of financial instruments, personal identification cards and documents, devices, and name-brand or luxury goods.

15. The system of claim 14, wherein the item is selected from the group consisting of currency, bank notes, credit cards, securities, bonds, and checks.

16. The system of claim 1, wherein the crystalline material is a metal.

17. The system of claim 1, wherein the crystalline material is a crystalline polymer or a ceramic.

18. The system of claim 1, wherein the label is formed for a material comprising at least two polymers that are phase separated, and wherein the polymers are phase separated by a method comprising the steps of:
   (a) mixing the polymers by dissolution or melting, and
   (b) demixing the polymers to form a solid material comprising discrete regions.

19. The method of claim 5, wherein the crystalline material is a metal.

20. The method of claim 5, wherein the crystalline material is a crystalline polymer or a ceramic.

21. The method of claim 5, wherein the label is formed for a material comprising at least two polymers that are phase separated, and wherein the polymers are phase separated by a method comprising the steps of:
   (a) mixing the polymers by dissolution or melting, and
   (b) demixing the polymers to form a solid material comprising discrete regions.

* * * * *

UNITED STATES PATENT AND TRADEMARK OFFICE
CERTIFICATE OF CORRECTION

| | | |
|---|---|---|
| PATENT NO. | : 7,963,563 B2 | |
| APPLICATION NO. | : 11/993987 | |
| DATED | : June 21, 2011 | |
| INVENTOR(S) | : Spencer et al. | |

It is certified that error appears in the above-identified patent and that said Letters Patent is hereby corrected as shown below:

Title page, Item (54), title, replace "Indentification" with --Identification--.

Column 16, line 1, replace "the pattern by viewing" with --the pattern varies by viewing--.

Column 16, line 4, replace "claim 5, the label" with --claim 5, wherein the label--.

Column 16, line 18, replace "seamier." with --scanner.--.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,963,563 B2 | Page 1 of 1 |
| APPLICATION NO. | : 11/993987 | |
| DATED | : June 21, 2011 | |
| INVENTOR(S) | : Spencer et al. | |

It is certified that error appears in the above-identified patent and that said Letters Patent is hereby corrected as shown below:

Title page, Item (54) and Column 1, lines 1-2, title, replace "Indentification" with --Identification--.

Column 16, line 1, replace "the pattern by viewing" with --the pattern varies by viewing--.

Column 16, line 4, replace "claim 5, the label" with --claim 5, wherein the label--.

Column 16, line 18, replace "seamier." with --scanner.--.

This certificate supersedes the Certificate of Correction issued May 15, 2012.

Signed and Sealed this
Nineteenth Day of June, 2012

David J. Kappos
*Director of the United States Patent and Trademark Office*